United States Patent [19]

Stilwell, Jr.

[11] Patent Number: 4,792,999
[45] Date of Patent: Dec. 20, 1988

[54] WAVELENGTH AGILE OPTICAL RECEIVER
[75] Inventor: George R. Stilwell, Jr., Raleigh, N.C.
[73] Assignee: International Business Machines Corporation, Armonk, N.Y.
[21] Appl. No.: 4,448
[22] Filed: Jan. 20, 1987
[51] Int. Cl.4 .............................................. H04B 9/00
[52] U.S. Cl. ......................................... 455/619; 370/3
[58] Field of Search ............... 455/606, 607, 617, 619, 455/612; 350/96.19; 370/3

[56] References Cited

U.S. PATENT DOCUMENTS

| | | | |
|---|---|---|---|
| 3,431,504 | 3/1969 | Adler | 455/614 |
| 3,971,930 | 7/1976 | Fitzmaurice et al. | 455/616 |
| 4,039,249 | 8/1977 | Kaminow et al. | 350/96.19 |
| 4,172,663 | 10/1979 | Byer et al. | 356/346 |
| 4,222,011 | 9/1980 | Kurnit | 330/4.6 |
| 4,571,024 | 2/1986 | Husbands | 350/96.19 |
| 4,671,603 | 6/1987 | McQuoid et al. | 350/96.19 |

Primary Examiner—Robert L. Griffin
Assistant Examiner—Leslie Van Beer
Attorney, Agent, or Firm—Gerald R. Woods

[57] ABSTRACT

A wavelength agile optical receiver can be used in an optical equivalent of an "order wire" data communication system. The receiver includes an acousto-optic grating which can be tuned to deflect optical signals received at a particular wavelength by changing a drive signal produced by an acoustic transducer. A multiwavelength optical signal is applied to the grating. Under "order wire" or quiescent conditions, light at an order wire wavelength is deflected onto a split optical detector. A processor is employed to select control signals for a voltage-controlled oscillator which drives the acoustic transducer. The processor can cause the transducer output to be changed to provide deflection of optical energy at a selectable wavelength onto the detector.

8 Claims, 1 Drawing Sheet

WAVELENGTH AGILE OPTICAL RECEIVER

FIELD OF THE INVENTION

The present invention relates to an optical receiver and more particularly to an optical receiver which can be tuned to receive data transmitted on a particular carrier wavelength in a set of such wavelengths.

DESCRIPTION OF THE PRIOR ART

Optical fibers have well known advantages as a digital data transmission medium. The potential transmission rates or bandwidths of optical fibers are higher than those achievable with conventional electrical conductors. Optical fibers are considered less susceptible to signal degradation due to external fields or influences than are conventional conductors. Also, optical fibers offer better security than do conventional conductors since it is more difficult to tap or intercept data carried on such fibers without leaving evidence of the tap.

Conventionally, optical fibers have been used to transmit data serially; that is, one bit at a time. It is possible, however, to use optical fibers to transmit several bits of data simultaneously (in parallel) through the use of frequency or wavelength division multiplexing techniques. In a wavelength division multiplexing system, parallel bit streams or data channels independently modulate optical carriers having different wavelengths. The modulated carriers are combined into a single multi-wavelength optical signal using known grating or prism arrangements. The multi-wavelength optical signal is transmitted to a receiver over a single optical fiber.

At the receiver, gratings, prisms or wavelength-selective filters are used to separate the multi-wavelength composite optical signal into parallel optical signals, each characterized by a particular carrier wavelength. The parallel optical signals are applied to parallel detectors, each of which is tuned to a particular carrier wavelength.

In a common wavelength division multiplexing application, the parallel data channels are used for different bits in the same byte of information. Every byte in a transmission is intended for the same receiver. That receiver must have optical decoders capable of simultaneously processing data modulated at the different carrier wavelengths.

For certain applications, it may be desirable to use the different channels in a wavelength multiplexing arrangement to carry data intended for different receivers. In such systems, the receiver would respond only to data transmitted in a particular channel; that is, at a particular carrier wavelength.

A conventional wavelength division multiplexing receiver could be used for such an application. The parallel optical detectors in the conventional wavelength division multiplexing receiver would still receive signals of the different carrier wavelengths but would ignore all signals other than those superimposed on the carrier wavelength assigned to the receiver for the particular transmission session. If the system were to have N parallel data channels, each receiver would have to be equipped with N optical detectors, of which N−1 would be idle at any given time. This is obviously undesirable from a cost/performance standpoint since the greater cost of the parallel optical dtectors does not yield any greater performance.

Furthermore, equipping all receivers to receive all data channels poses a security problem. While it may be intended that a given receiver respond only to signals on a particular data channel, the conventional receiver will nevertheless receive all channels. There is little to prevent an unauthorized user from using outputs from any of the other data channels.

While receiver costs could be reduced and security could be improved by equipping each receiver with a single detector tuned to a particular carrier wavelength, this is not thought to be a desirable solution. A receiver with a single detector tuned to a particular carrier wavelength would necessarily be able to receive signals only on the channel using that wavelength. If that channel were occupied, the receiver would have to wait for the channel to be cleared notwithstanding other parallel channels might be idle during the entire time.

Optical detectors, whether used in single or multiple carrier receivers, have another disadvantage. While any carrier wavelength has a nominal assigned value, the actual value of the carrier wavelength may change or drift from time to time due to changes in ambient conditions, component tolerances or component aging. If the carrier wavelength drifts from the wavelength to which the receiving detector is tuned, a loss in received signal strength occurs.

While carrier drift can be controlled to some extent by establishing strict controls on the receiver environment or by tightly controlling component tolerances or performing frequent maintenance operations, all of these forms of control add either to the cost of the receiver or to the cost of receiver operation.

SUMMARY OF THE INVENTION

The present invention is a wavelength agile optical receiver which can be tuned to receive signals transmitted with a given carrier wavelength selectable from a set of different carrier wavelengths. The receiver can track the selected wavelength even though it may drift from its nominal value for the reasons discussed above.

A receiver constructed in accordance with the present invention includes a tunable grating which is placed in the path of an incoming signal. The refractive characteristics of the grating are dependent upon the value of an external drive signal. An optical detector receives an optical signal refracted from the grating. The receiver includes means for generating a drive signal having characteristics dependent upon a selected wavelength for tuning the grating to refract optical energy received at that wavelength onto the detector.

BRIEF DESCRIPTION OF THE DRAWINGS

While the specification concludes with claims particularly pointing out and distinctly claiming that which is regarded as the present invention, details of a preferred embodiment of the invention may be more readily ascertained from the following technical description when read in conjunction with the accompanying drawings wherein:

TECHNICAL DESCRIPTION

Figure 1:
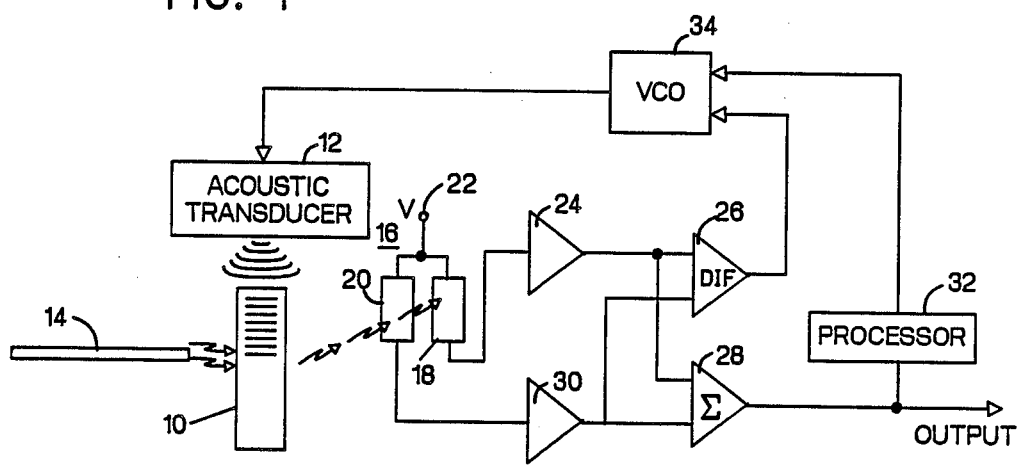
FIG. 1 is a schematic diagram of a wavelength agile optical receiver constructed in accordance with the present invention.

Referring to FIG. 1, the wavelength agile optical receiver includes a variable pitch optical grating 10 having a grating spatial frequency which is determined by an acoustical signal provided by an acoustic transducer 12. The acoustic wave impinging on the grating material changes the optical index of the material in a periodic way proportionate to the frequency of the acoustic signal. The periodic change in optical index is a form of optical grating which acts to deflect an optical signal provided by optical fiber 14 in a direction dependent upon the wavelength of the optical signal and the frequency of the acoustic wave.

The proper acoustic wave for a given optical wavelength will deflect the optical signal to a split detector 16 including a first photo active component 18, a second photo active component 20 and a common source 22 of bias voltage. The electrical output of each of the components 18 and 20 is a function of the energy level of the impinging optical signal. If both components are subjected to optical signals having the same energy level, both components should produce the same electrical output. Component 18 is connected through an amplifier 24 both to a differential amplifier 26 and to a summing amplifier 28. Component 20 is connected through an identical amplifier 30 to the differential amplifier 26 and the summing amplifier 28. The output from amplifier 28 provides the receiver output but is also applied to a receiver-controlling processor 32. The functions performed by the processor 32 are described in more detail later. An output from processor 32 is supplied to a voltage controlled oscillator 32. A second input to the oscillator 32 is provided by the differential amplifier 26. Oscilltor 34 has a single output to acoustic transducer 12, which generates the acoustic wave for controlling the properties of the electro-acoustic grating 10.

The voltage controlled oscillator 34 and differential amplifier 26, in combination with the split optical detector 16 and amplifiers 24 and 30, form a servo system which causes acoustic transducer 12 to change the generated acoustic wave to track slight changes in the wavelength of the optical signal due to changes in ambient conditions or component aging. If the wavelength of the optical signal drifts from its nominal wavelength, the direction in which the optical signal is deflected by grating 10 changes, causing more optical energy to be applied to one of the components 18 and 20 and less optical energy to be applied to the other of the componnts. The difference in electrical outputs from the components 18 and 20 is amplified by differential amplifier 26 to produce a difference siganl that is applied to the voltage controlled oscillator 34. The change in output of the oscillator 34 causes acoustic transducer 12 to change the acoustic wave applied to the grating material 10. The resulting change in the variable pitch of the grating 10 returns the deflected optical beam to a position in which components 18 and 20 are equally illuminated.

The preceding description does not deal with the manner in which the acoustic transducer 12 is driven to provide deflection of an incoming optical signal at a nominal carrier wavelength. The initial selection of a nominal carrier wavelength is carried out in processor 32 which provides a second input to voltage controlled oscillator 34. Assuming that differential amplifier 26 provides no input to voltage controlled oscillator 34, the output of oscillator 34 is directly dependent upon the output of processor 32. The oscillator output cause acoustic transducer 12 to generate an acoustic wave which affects the variable pitch optical grating 10 in such a way as to properly deflect incoming optical energy received at the nominal carrier wavelength. As discussed earlier, variations in the wavelength of the carrier from the nominal wavelength are reflected through the split transducer 16 and the differential amplifier 26 to one of the inputs to the voltage controlled oscillator 34.

Since processor 32 can produce a number of different control signals, it is possible to vary the output of voltage controlled oscillator 34 to provide deflection for optical signals received at any wavelength in a given set of wavelengths. Optical signals appearing on the incoming fiber 14 can be used to set the optical receiver to receive signals at a given carrier wavelength. Between transmissions, the optical receiver assumes a quiescent state in which a quiescent or default control signal is provided by processor 32 to voltage controlled oscillator 34. This quiescent control signal is reflected through acoustic transducer 12 to grating material 10 to cause incoming optical energy transmitted at a default carrier wavelength to be deflected onto the split optical detector 16. Such an arrangement is the optical equivalent of an order wire used in electrically conductive systems.

Figure 2:
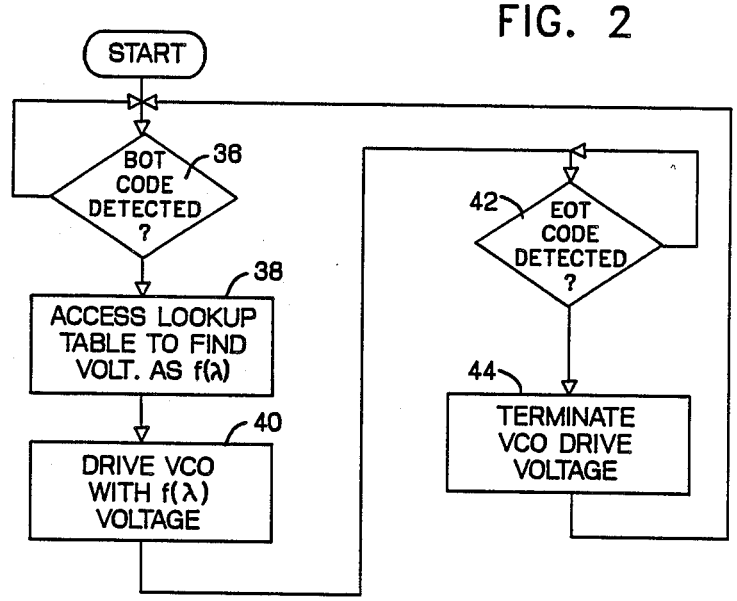
FIG. 2 is a flow chart of the control actions performed by the processor within the receiver.

FIG. 2 is a flow chart of control actions taken by processor 32 in order to drive the receiver from the quiescent or order wire mode to an active receiving mode at a given carrier wavelength and to return the receiver to the quiescent mode when transmission has been completed. Referring to that figure, processor 32 monitors signals provided by summing amplifier 28 for a particular code pattern during operation in the quiescent or order wire mode. The code pattern is one which indicates that an active data transmission is about to occur and which includes information indicating the carrier wavelength for the information to be transmitted. The processor 32 continually monitors the incoming data until an operation 36 determins that a wavelength indicating code (BOT code) has been detected. When a BOT code is detected, processor 32 accesses a look-up table (operation 38) to recover a voltage-indicating value appropriate for the wavelength identified by the BOT code. The retrieved voltage value is used to drive the voltage controlled oscillator (operation 40). The output of the oscillator 34 causes acoustic transducer 12 to produce acoustic waves which modify the grating characteristics of grating material 10 in such a way that optical signals subsequently received at the selected wavelength are deflected onto the split detector 16. These signals, representing data, are output from the system through the summing amplifier 28. The processor 32 continues to monitor the active data until an end of transmission (EOT) code is detected (operation 42). The EOT code is a signal to processor 32 to return the wavelength agile optical receiver to its quiescent state. In order to do this, processor 32 changes the input to voltage controlled oscillator 34 to provide the appropriate quiescent drive signal for acoustic transducer 12.

While there has been described what is considered to be a preferred embodiment of the invention, variations and modifications in that embodiment will occur to those of skill in the art. Therefore, it is intended that the appended claims shall be construed to include both the preferred embodiment and all such variations and modifications as fall within the true spirit and scope of the invention.

I claim:

1. A wavelength agile optical receiver for receiving a signal superimposed upon a carrier having a wavelength selectable from a set of wavelengths, said receiver including:
- a tunable grating in the path of an incoming signal, said grating have refractive characteristics dependent upon the value of an external drive signal;
- a split optical detector for receiving an optical signal refracted from said grating, said detector having first and second output terminals for providing output signals;
- means for generating a drive signal having characteristics dependent upon a selected wavelength for tuning said grating to refract optical energy received at that wavelength onto said optical detector; and
- means responsive to output signals from said split optical detector for adjusting the drive signal to fine tune the grating to follow slight changes in the wavelength of the received signal due to temperature changes or component aging.

2. A wavelength agile optical receiver as defined in claim 3 wherein said output responsive means comprises:
- a differential amplifier for comparing the difference in outputs from the first and second output terminals of said split optical detector; and
- a voltage controlled oscillator having an input from said differential amplifier and an output to said drive signal generating means.

3. A wavelength agile optical receiver as defined in claim 2 further including a summing amplifier connected to the first and second output terminals of said split optical detector for summing the output signals produced by said detector to provide a receiver output signal.

4. A wavelength agile optical receiver for receiving a signal superimposed upon a carrier having a wavelength selectable from a set of wavelengths, said receiver including:
- a tunable grating in the path of an incoming signal, said grating have refractive characteristics which can be changed from quiescent characteristics by an external drive signal;
- an optical detector for receiving a split optical signal refracted from said grating;
- means responsive to optical signals refracted to the optical detector while the grating displays quiescent characteristics to select a particular wavelength in the set of wavelengths;
- means for generating a drive signal having characteristics dependent upon the selected wavelength for tuning said grating to refract optical energy received at that wavelength onto said optical detector.

5. A wavelength agile optical receiver as defined in claim 4 further including means responsive to output signals from said split optical detector for adjusting the drive signal to fine tune the grating to follow slight changes in the selected wavelength of the received signal due to temperature changes or component aging.

6. A wavelength agile optical receiver as defined in claim 5 wherein said output responsive means comprises:
- a differential amplifier to comparing the difference in outputs from the first and second output terminals of said split optical detector; and
- a voltage controlled oscillator having an input from said differential amplifier and an output to said drive signal generating means.

7. A wavelength agile optical receiver as defined in claim 6 further including a summing amplifier connected to the first and second output terminals of said split optical detector for summing the output signals produced by said detector to provide a receiver output signal.

8. A wavelength agile optical receiver as defind in claim 7 further including logic means responsive to a predetermined pattern in the optical energy received at the selected wavelength to terminate the characteristic varying drive signal so that the tunable grating assumes its quiescent characteristics.

* * * * *